(12) United States Patent
Kielb et al.

(10) Patent No.: US 6,373,261 B1
(45) Date of Patent: *Apr. 16, 2002

(54) TWO-WIRE LEVEL TRANSMITTER

(75) Inventors: John A. Kielb, Eden Prairie, MN (US); Scott D. Manicor, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,358

(22) Filed: Oct. 12, 1999

Related U.S. Application Data

(62) Division of application No. 08/937,730, filed on Sep. 25, 1997, now abandoned, which is a continuation of application No. 08/486,649, filed on Jun. 7, 1995, now Pat. No. 5,672,975.

(51) Int. Cl.[7] .............................................. G01F 23/28
(52) U.S. Cl. ..................................... 324/644; 73/290 R
(58) Field of Search .................. 324/644, 642, 324/643, 637, 645; 342/124; 73/290 R; 340/612, 618

(56) References Cited

U.S. PATENT DOCUMENTS

| | | | |
|---|---|---|---|
| 3,614,318 A | 10/1971 | Klose | 178/68 |
| 3,626,274 A | 12/1971 | Christofzlk | 323/1 |
| 4,015,472 A | 4/1977 | Herzl | 73/194 |
| 4,095,064 A | 6/1978 | Fleckenstein | 200/61.21 |
| 4,146,869 A | 3/1979 | Snyder | 340/1 |
| 4,147,906 A | 4/1979 | Levine | 200/61.2 |
| 4,163,917 A | 8/1979 | Levine | 310/327 |
| 4,255,859 A | 3/1981 | Klieman | 33/126.6 |
| 4,365,509 A | 12/1982 | Cornelis | 73/290 |

(List continued on next page.)

FOREIGN PATENT DOCUMENTS

| | | |
|---|---|---|
| CA | 1 256 301 | 6/1989 |
| CA | 2142740 | 10/1999 |
| DE | 31 07 091 A1 | 1/1982 |
| DE | 38 12 293 C2 | 10/1989 |
| DE | 38 35 406 A1 | 4/1990 |
| DE | 39 04 824 A1 | 8/1990 |
| DE | 41 26 063 A1 | 2/1992 |
| DE | 43 07 635 A1 | 9/1993 |

(List continued on next page.)

OTHER PUBLICATIONS

*Introduction to Radar Systems, Second Edition,* by M. Skolnik, pp. 71–74, (Month Unavailable) 1980.

"Using Radar Level Measurement For Increased Environmental Protection and Plant Safety", by J. Daniewicz, *Advances in Instrumentation and Control,* vol. 46, Part 2, Oct. 27–31, 1991.

"Understanding Two–Wire Transmitters", *Plant Engineering,* vol. 38, No. 23, Oct. 11, 1984.

(List continued on next page.)

*Primary Examiner*—Ernest Karlsen
(74) *Attorney, Agent, or Firm*—Westman, Champlin & Kelly, P.A.

(57) ABSTRACT

A level transmitter for use in a process application measures height of a product in a tank. The level transmitter includes a microwave antenna directed into the tank. A low power microwave source sends a microwave signal through the microwave antenna. A low power microwave receiver receives a reflected microwave signal. Measurement circuitry coupled to the source and receiver initiates transmitting of the microwave signal and determines product height based upon the received, reflected signal. Output circuitry coupled to a two-wire process control loop transmits information related to product height over the loop. Power supply circuitry in the level transmitter coupled to the two-wire process control loop receives power from the loop which powers the level transmitter including the microwave source and the microwave receiver.

20 Claims, 2 Drawing Sheets

U.S. PATENT DOCUMENTS

| | | | |
|---|---|---|---|
| 4,392,032 A | 7/1983 | Roach, II | 200/61.21 |
| 4,425,793 A | 1/1984 | Turton et al. | 73/290 |
| 4,555,941 A | 12/1985 | Fathauer et al. | 73/304 |
| 4,566,321 A | 1/1986 | Zacchio | 73/290 |
| 4,596,144 A | 6/1986 | Panton et al. | 73/620 |
| 4,624,139 A | 11/1986 | Collins | 73/304 |
| 4,661,817 A | 4/1987 | Bekkadal et al. | 342/124 |
| 4,675,854 A | 6/1987 | Lau | 367/908 |
| 4,676,099 A | 6/1987 | McGookin | 73/290 |
| 4,676,100 A | 6/1987 | Eichberger | 73/304 |
| 4,677,646 A | 6/1987 | Dodds et al. | 375/36 |
| 4,695,685 A | 9/1987 | Fleckenstein et al. | 200/61.21 |
| 4,700,569 A | 10/1987 | Michalski et al. | 73/290 |
| 4,794,372 A | 12/1988 | Kazahaya | 340/870.16 |
| 4,800,755 A | 1/1989 | Fathauer et al. | 73/304 |
| 4,910,878 A | 3/1990 | Fleckenstein et al. | 33/719 |
| 4,972,386 A | 11/1990 | Lau | 367/99 |
| 5,048,335 A | 9/1991 | Marsh et al. | 73/304 |
| 5,088,325 A | 2/1992 | Eichberger et al. | 73/304 |
| 5,095,748 A | 3/1992 | Gregory et al. | 73/290 |
| 5,105,662 A | 4/1992 | Marsh et al. | 73/290 |
| 5,150,334 A | 9/1992 | Crosby | 367/98 |
| 5,161,411 A | 11/1992 | Cruickshank | 73/293 |
| 5,164,555 A | 11/1992 | Brenton | 200/61.21 |
| 5,164,606 A | 11/1992 | Secord | 250/577 |
| 5,166,678 A * | 11/1992 | Warrior | 340/870.15 |
| 5,207,101 A | 5/1993 | Haynes | 73/597 |
| 5,223,819 A | 6/1993 | Marsh et al. | 340/617 |
| 5,245,873 A | 9/1993 | Fathauer et al. | 73/304 |
| 5,254,846 A | 10/1993 | Fayfield | 250/205 |
| 5,277,054 A | 1/1994 | Campbell | 73/1 |
| 5,309,763 A | 5/1994 | Sinclair | 73/290 |
| 5,337,289 A | 8/1994 | Fasching et al. | 367/140 |
| 5,345,471 A | 9/1994 | McEwan | 375/1 |
| 5,351,036 A | 9/1994 | Brown et al. | 340/618 |
| 5,361,070 A | 11/1994 | McEwan | 342/21 |
| 5,465,094 A | 11/1995 | McEwan | 342/28 |
| 5,609,059 A | 3/1997 | McEwan | 73/290 |
| 5,672,975 A * | 9/1997 | Kielb et al. | 324/644 |
| 5,847,567 A | 12/1998 | Kielb et al. | 324/642 |
| 6,047,598 A | 4/2000 | Otto et al. | 73/290 |

FOREIGN PATENT DOCUMENTS

| | | |
|---|---|---|
| DE | G 93 09 651.8 | 11/1993 |
| DE | 44 05 238 A1 | 8/1995 |
| EP | 0 042 186 A1 | 12/1981 |
| EP | 0 961 106 A1 | 2/1995 |
| EP | 0 668 488 A2 | 8/1995 |
| GB | 2 081 452 A | 2/1982 |
| GB | 2 225 113 A | 5/1990 |
| GB | 2 290 142 A | 12/1995 |
| WO | WO 96/10734 * | 4/1996 |
| WO | WO 96/41135 * | 12/1996 |

OTHER PUBLICATIONS

"Two–Wire Field–Mounted Transmitters: Advantages and Problems", by R. Rosenberg et al., *Advances in Instrumentation and Control*, vol. 40, Part 2, Oct. 21–24, 1985.

"The Levelite Store" Brochure dated (Month Unavailable) 1995.

"Complaint For Patent Infringement", Civil Action No. 00–208, dated Mar. 21, 2000.

"Ohmart/Vega Corporation's First Amendment Answer, Affirmative Defenses and Counterclaims to Complaint" dated Sep. 12, 2000.

"Vega Grieshaber KG's Answer Affirmative Defenses and Counterclaims" dated Sep. 12, 2000.

Amendment filed Dec. 17, 1996 in U.S. Serial No. 08/315,429, now U.S. Patent No. 5,847,567.

"Smart Transmitter Using Microwave Pulses to Measure the Level of Liquids and Solids in Process Applications", by Hugo Lang et al., *ISA*, (Month Unavailable) 1993, pp. 731–742.

"Radar on a Chip", *Popular Science*, Mar. 1995, pp. 3, 107–110, 116 and 117.

"Control Devices and Systems," *Control Engineering*, Jul. 1984, p. 68.

"Bindicator Cap—Level II Series", from Bindicator Company, 5/92, 2 pages.

Mergers & Acquisitions Report, by Kayeness Inc., Jun. 13, 1994.

News Release: May 1991, by Genelco Bindicator, entitled "Continuous Radio Frequency Level Sensor for Liquids".

News Release: May 1989, by Bindicator, entitled "Continuous Level Sensor Provides Accuracy".

News Release: Sep. 9, 1988, by Bindicator, entitled "Display Converts Analog Signal to Visual Readout".

News Release: Jul. 7, 1988, by Bindicator, entitled "Remote Level Sensor Offers Easy Calibration".

News Release: Apr. 1988, by Bindicator, entitled Radio Frequency Level Control with F.E.A.T.

News Release: Oct. 30, 1987, by Bindicator, entitled "A Solid–State Analog Display (no moving parts) that Converts the Analog Input Signal to a Visual Readout of 0–100%".

New Product Announcement No. 0165416: Jun. 1987, by Bindicator search.

New Product Announcement No. 0164492: Jun. 8, 1987, by Bindicator.

New Product Announcement No. 0163995: Jun. 1987, by Bindicator.

New Product Announcement No. 0156975, Jun. 10, 1987, by Phillips Petroleum.

New Product Announcement No. 0153579, Jan. 1987, by Silomaster Bindicator.

New Product Announcement No. 0152828, Feb. 1987, by Silomaster Bindicator.

New Product Announcement No. 0148685, Dec. 22, 1986, by Bindicator.

New Product Announcement No. 0135139, Jul. 1986, by Bindicator.

New Product Announcement No. 0117474: Aug. 1985, by Bindicator.

New Bulletin, Sep. 1985, by Bindicator.

New Product Announcement No. 101134, Jun. 1985, by Bindicator Berwind.

New Product Announcement No. 101132, Jun. 1985, by Bindicator Berwind.

Advertisement: "Wave Radar", *Level Transmitters*, (Month Unavailable) 1995, pp. 14 and 15.

* cited by examiner

TWO-WIRE LEVEL TRANSMITTER

This is a Divisional patent application of U.S. Ser. No. 08/937,730, filed Sep. 25, 1997, now abandoned, which is a Continuation of U.S. Ser. No. 08/486,649, filed Jun. 7, 1995, now U.S. Pat. No. 5,672,975.

BACKGROUND OF THE INVENTION

The present invention relates to level measurement in industrial processes. More specifically, the present invention relates to measurement of product level height in a storage tank of the type used in industrial applications using a microwave level gauge.

Instrumentation for the measurement of product level (either liquids or solids) in storage vessels is evolving from contact measurement techniques, such as tape and float, to non-contact techniques. One technology that holds considerable promise is based on the use of microwaves. The basic premise involves transmitting microwaves towards the product surface and receiving reflected microwave energy from the surface. The reflected microwaves are analyzed to determine the distance that they have traveled. Knowledge of the distance traveled and storage vessel height allows determination of product level. Since it is known that microwaves travel at the speed of light, the distance that a microwave travels can be determined if the time of travel is known. The time of travel can be determined by measuring the phase of the return wave and knowing the frequency of the microwave that was transmitted. Further, the time of travel can be measured using well-known digital sampling techniques.

One standard in the process control industry is the use of 4–20 mA process control loops. Under this standard, a 4 mA signal represents a zero reading and a 20 mA signal represents a full scale reading. Further, if a transmitter in the field has sufficiently low power requirements, it is possible to power the transmitter using current from the two-wire loop. However, microwave level transmitters in the process control industry have always required a separate power source. The level transmitters were large and their operation required more power than could be delivered using the 4–20 mA industry standard. Thus, typical prior art microwave level transmitters required additional wiring into the field to provide power to the unit. This additional wiring was not only expensive but also was a source of potential failure.

SUMMARY OF THE INVENTION

A level transmitter measures height of product in a tank such as those used in industrial process applications. The level transmitter is coupled to a two-wire process control loop which is used for both transmitting level information provided by the level transmitter and for providing power to the level transmitter. The level transmitter includes a microwave antenna directed into the tank. A low power microwave source sends a microwave signal through the antenna into the tank. A low power microwave receiver receives a reflected microwave signal. Measurement circuitry coupled to the low power microwave source and to the low power microwave receiver initiates transmitting of the microwave signal and determines product height based upon the reflected signal received by the receiver. Output circuitry coupled to the two-wire process control loop transmits information related to product height over the loop. Power supply circuitry coupled to the two-wire process control loop receives power from the loop to power the level transmitter.

In one embodiment, the measurement circuitry includes a first clock coupled to the source for periodically initiating the microwave signal at a first clock rate. A second clock coupled to the receiver periodically gates the received signal at a second clock rate.

DETAILED DESCRIPTION OF THE PREFERRED EMBODIMENTS

Figure 1:
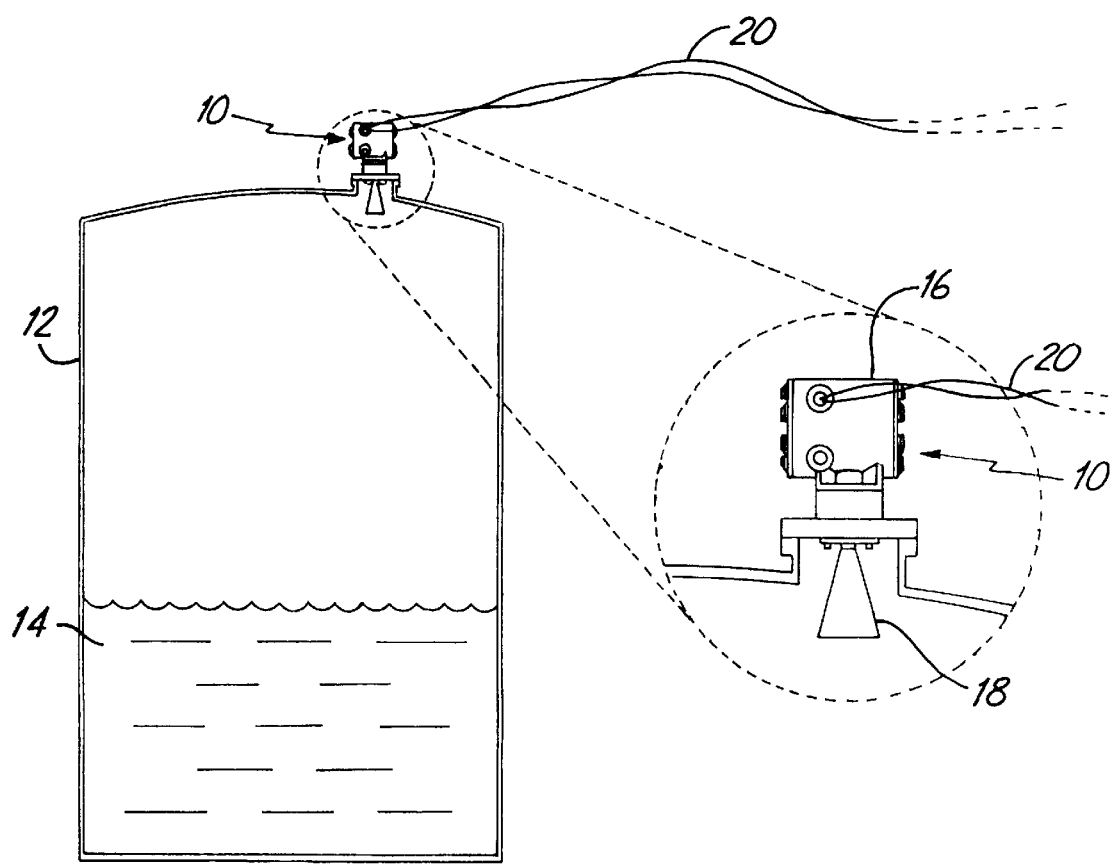
FIG. 1 is a diagram of a microwave level transmitter in accordance with the invention.

FIG. 1 is a diagram which shows microwave level transmitter 10 operably coupled to storage tank 12. Storage tank 12 is the type typically used in process application and contains fluid (product) 14. As used herein, product can be a liquid, a solid or a combination of both. Level transmitter 10 includes housing 16 and feedhorn 18. Transmitter 10 is coupled to two-wire loop 20. Two-wire loop 20 is a 4–20 mA process control loop. In accordance with the invention, transmitter 10 transmits information related to product 14 height over loop 20. Further, transmitter 10 is completely powered by power received over loop 20. In some installations, transmitter 10 meets intrinsic safety requirements and is capable of operating in a potentially explosive environment without danger of causing an ignition. For example, housing 16 is tightly sealed to contain any ignition, and circuitry in housing 16 is designed to reduce stored energy, thereby reducing potential ignition.

Figure 2:
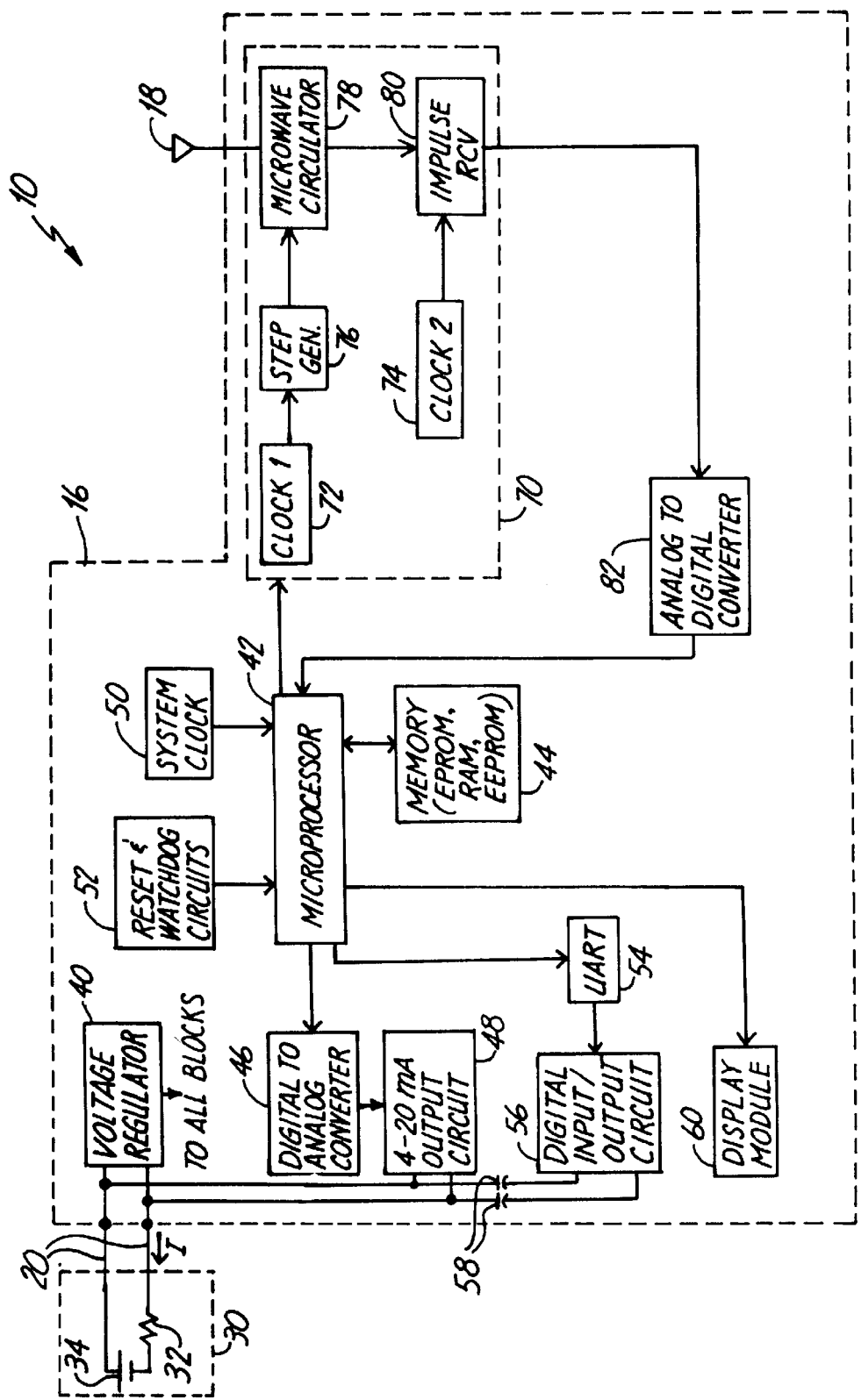
FIG. 2 is a block diagram showing electrical circuitry of the level transmitter of FIG. 1.

FIG. 2 is a block diagram of level transmitter 10 coupled to a process control room 30 over two-wire process control loop 20. Control room 30 is modeled as resistor 32 and voltage source 34. Transmitter 10 controls the current I flowing through loop 20 in response to height of product 14 in tank 12.

Electric circuitry carried in housing 16 of transmitter 10 includes voltage regulator 40, microprocessor 42, memory 44, digital-to-analog converter 46 coupled to analog output circuitry 48, system clock 50 and reset circuitry 52. Microprocessor 42 is connected to UART 54 which controls digital I/O circuit 56 and is coupled to current loop 20 through DC blocking capacitors 58. UART 54 can also be a part of microprocessor 42. Microprocessor 42 is also coupled to display module 60 for providing a display output and to transceiver circuitry 70.

Transmitter housing 16 includes microwave transceiver circuitry 70 which includes clock-1 72 and clock-2 74. The output of clock-1 72 is coupled to step generator 76 which provides an input signal to microwave circulator 78. Microwave circulator 78 is coupled to antenna 18 and provides an input to impulse receiver 80. Impulse receiver 80 also receives an input from clock-2 74 and provides an output to analog-to-digital converter 82.

In operation, transmitter 10 is in communication with control room 30 over loop 20 and receives power over loop 20. Voltage regulator 40 provides regulated voltage outputs to electronic circuitry in transmitter 10. Transmitter 10 operates in accordance with instructions stored in memory 44 under the control of microprocessor 42 at a clock rate determined by system clock 50. A reset and watchdog circuit 52 monitors the supply voltage to the microprocessor and memory. During power on, circuit 52 provides a reset signal to microprocessor 42 once the supply voltage has reached a sufficient level to allow operation of microprocessor 42. Additionally, microprocessor 42 periodically ides a "kick"

signal to watchdog circuit 52. If these kick pulses are not received by circuit 52, circuit 52 provides a reset input to microprocessor 42 to thereby restart microprocessor 42.

Microprocessor 42 receives data from circuitry 70 through analog-to-digital converter 82 to determine product level height. Clock-1 72 operates at a first clock frequency $f_1$ and clock-2 74 operates at a second frequency $f_2$. Clock-1 72 acts as a "start transmit" clock and clock-2 74 operates as a "gate receiver" clock, and the clocks are slightly offset in frequency. That is, $f_2=f_1+\Delta f$. This provides a digital sampling technique described in the ISA paper entitled "Smart Transmitter Using Microwave Pulses to Measure The Level Of Liquids And Solids In Process Applications," by Hugo Lang and Wolfgang Lubcke of Endress and Hauser GmbH and Company, Maulburg, Germany. Product height is calculated by determining which cycle of clock-2 74 coincides with a received microwave pulse. In one embodiment, clock-1 72 is set for a frequency of between 1 MHz and 4 MHz, depending upon such condition at the installation as the maximum distance to be measured and current consumption requirements of the circuitry. Clock-2 74 is synchronized to clock-1 72, but varies in frequency by between about 10 Hz and 40 Hz. The difference in frequency ($\Delta f$ which provides a difference in clock rates) between clocks 72 and 74 determines the update rate of transmitter 10. It is possible to obtain a higher received signal level by integrating received pulses over several cycles at the expense of reduced update rates.

The signal of clock-2 74 provides a gating window which sweeps through the incoming signal at a rate determined by $\Delta f$. Impulse receiver 80 gates the incoming microwave signal using the $f_2$ signal from clock-2 74. The output of impulse receiver 80 is a series of pulses. These pulses will vary in amplitude dependent upon the noise or spurious reflections contained in the received signal. When the receipt of the microwave echo from the product surface is coincident with the gate pulse from clock-2 74, a larger output pulse results, and is converted to a larger value by analog-to-digital converter 82. Microprocessor 42 calculates distance by determining which cycle of clock-2 74 provided the largest output pulse from receiver 80. Microprocessor 42 determines distance by knowing which gate pulse caused the largest output pulses from impulse receiver 80 as determined by analog-to-digital converter 82. Product height is determined by the equation:

$$\text{Level} = \text{Tank Height} - \text{Distance of Pulse Travel} \qquad \text{Eq. 1}$$

$$\text{Level} = \text{Tank Height} - \frac{R \cdot \Delta f}{f_1} \cdot \frac{C}{2 \cdot f_1} \qquad \text{Eq. 2}$$

$$\text{One Way Distance of Pulse Travel} = \frac{R \cdot \Delta f}{f_1} \cdot \frac{C}{2 \cdot f_1} \qquad \text{Eq. 3}$$

where:

$f_1$=clock 1 frequency $f_2$=clock 2 frequency $\Delta f = f_2 - f_1$

R=Receive sample pulse which detected return to echo (R=O to $f_1/\Delta f$)

Analog-to-digital converter 82 should have a fairly fast conversion rate, for example 0.5 µs, when the transmit rate (clock 1) is 2 MHz since a sample must be taken after every transmit pulse to see if an echo is present, converter 82 should have a sampling rate which must at least equal the frequency of clock-1 72. One example of such an analog-to-digital converter is the sigma-delta converter described in co-pending U.S. patent application Ser. No. 08/060,448 entitled SIGMA DELTA CONVERTER FOR VORTEX FLOWMETER. The resolution of analog-to-digital converter 82 is not particularly critical because only the presence or absence of a pulse is significant.

To further improve performance of transmitter 10, the receive and transmit circuits in circuitry 70 are electrically isolated from each other. This is important so that transmit pulses are not incorrectly detected by the receiver as the echo pulse. The use of microwave circulator 78 permits accurate control of the source impedance and the receive impedance. The microwave circulator provides isolation between transmit and receive circuitry. Further, circulator 78 prevents the transmit pulse from causing the received circuit to ring. One example circulator is a three-port device which only allows signals from the transmit circuit (step generator 76) to reach antenna 18 and incoming signals from antenna 18 to reach receive circuitry 80. Electrical isolation between transmit and receive circuits may be obtained by other techniques known to those skilled in the art. For example, circulator 78 may be removed and a separate transmit and receive antenna implemented. Further, circuit isolation techniques may be employed which provide isolation between transmit and receive circuits along with a delay circuit such that a received pulse was not received until after any "ringing" from the transmit pulse had faded. In another embodiment, microwave antenna 18 is replaced by a probe which extends into tank 12 shown in FIG. 1. This embodiment may also include a circulator.

Based upon the detection of an echo pulse by microprocessor 42 through analog-to-digital converter 82, microprocessor 42 determines the height of product 14 in tank 12. This information can be transmitted digitally over two-wire loop 20 using digital circuit 56 under the control of UART 54. Alternatively, microprocessor 42 can control the current level (between, for example, 4 and 20 mA) using digital-to-analog converter 46 to control output circuit 48 and thereby transmit information over two-wire loop 20. In one embodiment, microprocessor 42 can be set to provide a high output (for example 16 mA) on loop 20 if the product level is either above or below a threshold level stored in memory 44.

In one preferred embodiment, microprocessor 42 comprises a Motorola 68HC11. This is a low power microprocessor which also provides high speed operation. Another suitable microprocessor is the Intel 80C51. Low power memory devices are preferred. In one embodiment, a 24 Kbyte EPROM is used for program memory, 1 Kbyte RAM is used for working memory and a 256 byte EEPROM non-volatile memory is provided. A typical system clock for a microprocessor is between about 2 MHz and 4 MHz. However, a slower clock requires less power but also yields a slower update rate. Typically, power supply 40 provides efficient conversion of power from the control loop into a supply voltage. For example, if the input power supply is 12 volts and the level gauge electronics require 4 mA, the power supply must efficiently convert this 48 mwatts into a usable supply voltage, such as 5 volts.

The invention provides a number of significant advancements over the art. For example, transmitter 10 is completely powered by power received over two-wire current loop 20. This reduces the amount of wiring required to place transmitter 10 at a remote location. Microprocessor 42 is also capable of receiving commands over two-wire current loop 20 sent from control room 30. This is according to a digital communications protocol, for example the HART® communication protocol or, preferably, a digital communications protocol having a dc voltage averaging zero.

Although the present invention has been described with reference to preferred embodiments, workers skilled in the art will recognize that changes may be made in form and detail without departing from the spirit and scope of the invention.

What is claimed is:

1. A level transmitter coupleable to a two-wire process control loop configured to carry a current between 4 mA and 20 mA, the level transmitter for measuring height of a product in a tank, comprising:

a source adapted to send electromagnetic pulsed signals into the tank;

a receiver adapted to receive reflected electromagnetic pulsed signals from the tank;

an analog to digital converter configured to convert an output from the receiver into digital data;

a digital processor configured to receive data from the analog to digital converter and adapted to determine product height based upon received reflected electromagnetic signals as a function of tank height and distance of pulse travel;

a power supply including a voltage regulator adapted to provide a regulated output voltage to components of the level transmitter; and an output device coupleable to the two-wire process control loop and adapted to transmit information related to product height over the loop, the information transmitted digitally;

wherein the level transmitter is adapted to receive power from the loop, wherein power from the loop is the sole source of power for all components of the level transmitter.

2. The level transmitter of claim 1 including:

a microwave antenna coupled to the source and to the receiver configured to transmit the electromagnetic pulsed signals from the source into the tank and to receive the reflected electromagnetic pulsed signals from the tank.

3. The level transmitter of claim 1 wherein the output device is coupled to a UART.

4. The level transmitter of claim 1 including a 4–20 mA output circuit coupleable to the two-wire process control loop to control current in the two-wire process control loop.

5. The level transmitter of claim 1 including a memory coupled to the digital processor.

6. The level transmitter of claim 5 wherein the memory comprises an EPROM.

7. The level transmitter of claim 5 wherein the memory comprises a EEPROM.

8. The level transmitter of claim 5 wherein the memory comprises RAM.

9. The level transmitter of claim 1 including a system clock coupled to the digital processor.

10. The level transmitter of claim 1 including a display module coupled to the digital processor.

11. The level transmitter of claim 4 including a digital to analog converter coupled between the digital processor and the 4–20 mA output circuit.

12. The level transmitter of claim 1 including a capacitor configured to couple the output device to the two-wire process control loop.

13. The level transmitter of claim 1 including a reset circuit coupled to the digital processor.

14. The level transmitter of claim 1 wherein the source includes a step generator.

15. The level transmitter of claim 1 including a system clock and wherein the digital processor operates in accordance with instructions stored in a memory and at a clock rate determined by the system clock.

16. The level transmitter of claim 13 wherein the reset circuit provides a reset signal to the digital processor once the regulated output voltage from the power supply has reached a sufficient level to allow operation of the digital processor.

17. The level transmitter of claim 1 wherein the product height is a function of an integration of a plurality of received pulses.

18. The level transmitter of claim 1 including a microwave circulator coupled to the source and receiver.

19. The level transmitter of claim 1 including a housing which houses the source, receiver, analog to digital converter, digital processor, power supply and output device.

20. The level transmitter of claim 1 wherein the determined product height is further a function of a difference in clock rates.

* * * * *